United States Patent [19]

Hicks

[11] 3,845,365

[45] Oct. 29, 1974

[54] GLASS CERAMIC CAPACITORS WITH TENARY ALLOY ELECTRODES AND METHOD OF MAKING THE SAME

[75] Inventor: William Thomas Hicks, Lewiston, N.Y.

[73] Assignee: E. I. du Pont de Nemours and Company, Wilmington, Del.

[22] Filed: Sept. 6, 1973

[21] Appl. No.: 394,822

[52] U.S. Cl.................. 317/258, 29/25.42, 252/514
[51] Int. Cl............................................... H01c 1/01
[58] Field of Search......... 106/1; 252/514; 317/258; 29/25.42

[56] References Cited
UNITED STATES PATENTS 3,407,081    10/1968    Ballard............................. 252/514
3,609,105    9/1971     Cole................................. 252/514

OTHER PUBLICATIONS

Miller; L. F.,"Thin Film Technology & Chip Joining" Gordon & Breach N.Y. 1972, pp. 53, 54 pp. 66–72.

*Primary Examiner*—E. A. Goldberg

[57] ABSTRACT

An improved method for making low-cost multilayer capacitors of glass-ceramic dielectrics and noble metal electrodes, and the resultant capacitors. The noble metal electrodes contain critical proportionate amounts of gold, palladium and silver.

18 Claims, 1 Drawing Figure

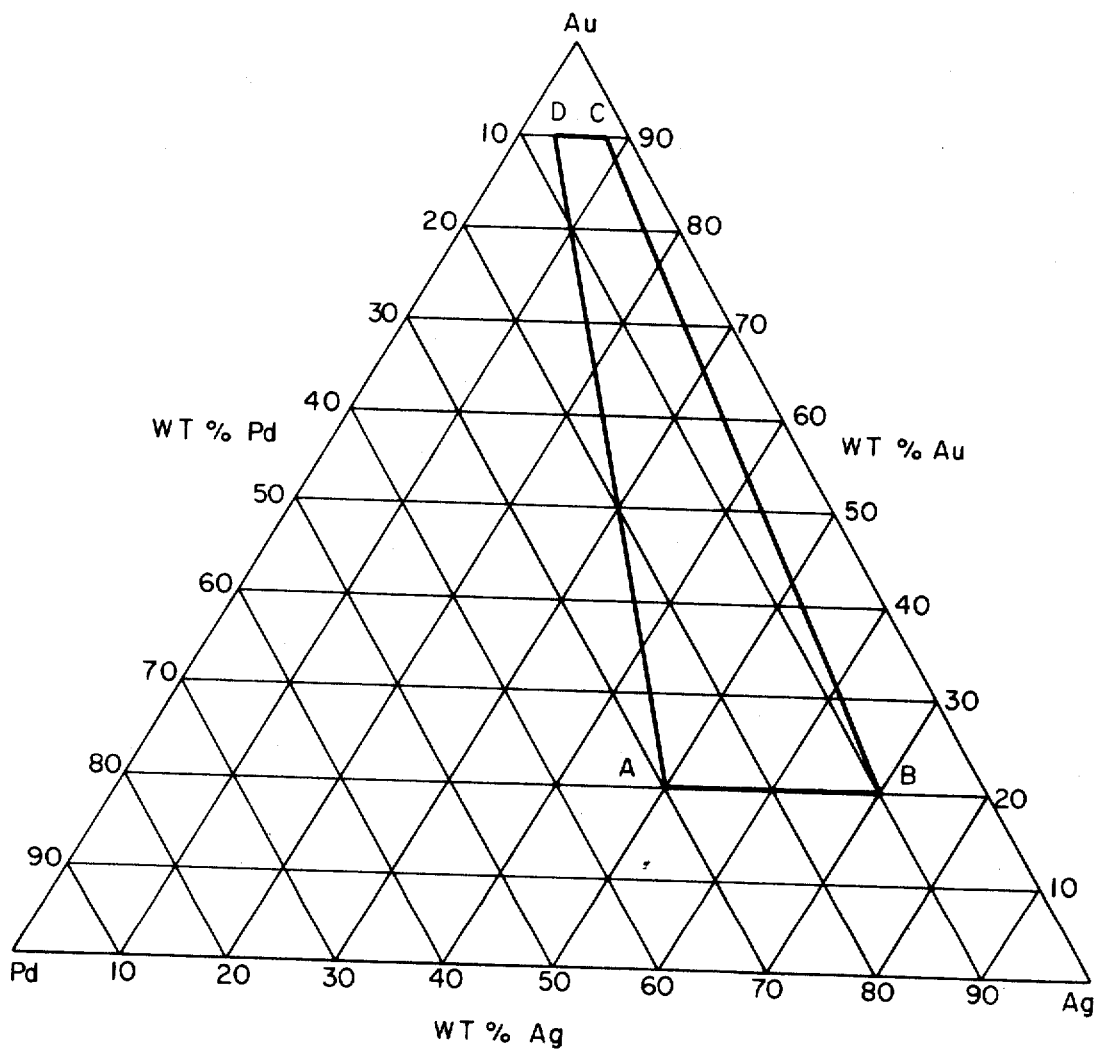

GLASS CERAMIC CAPACITORS WITH TENARY ALLOY ELECTRODES AND METHOD OF MAKING THE SAME

BACKGROUND OF THE INVENTION

This invention relates to multilayer capacitors, and, more particularly, to glass-ceramic capacitors and an improved method of making the same.

Multilayer capacitors of glass-ceramic dielectrics and gold electrodes are commercially available. A method of making such capacitors is disclosed in McBrayer et al. U.S. Pat. No. 3,604,082, issued Sept. 14, 1971. Such capacitors are commercially attractive since they may be formed by heating at relatively low temperatures, below 1,100°C. and often below 1,000°C., as compared with firing temperatures of 1,200°-1,500°C. for multilayer capacitors made from platinum, palladium, or platinum/palladium alloy electrodes with ceramic dielectric materials such as barium titanate.

Glass ceramics are well known in the art, and are obtained by firing certain glass compositions at temperatures which cause at least partial crystallization of the glass. Exemplary of such glasses are those of Herczog et al. U.S. Pat. No. 3,195,030, issued July 13, 1965.

Due to the greatly-increased cost of gold, there is a need for a process using electrode compositions which are less expensive than the currently used all-gold systems, but at least equivalent technically thereto. Specifically, there is a need for a process similar to that of U.S. Pat. No. 3,604,082, for producing multilayer capacitors not prone to excessive cracking upon cooling, but with good capacitance and dissipation factor characteristics. The melting point of the electrode compositions must not be too low, or the electrode will melt and lose continuity during firing.

SUMMARY OF THE INVENTION

In a method of making a multilayer capacitor comprising the steps of:

1. forming a plurality of thin dielectric sheets in the green state comprising a crystallizable glass powder in an organic binder, 2. applying a metal film of finely divided noble metal powder dispersed in an inert vehicle to at least two of said green dielectric sheets in a predetermined pattern, 3. disposing said green dielectric sheets with said metal film applied thereto in a stack such that each of said metal films is separated from adjacent metal films by one of said green dielectric sheets and such that the first two metal films of the stack partly overlap each other, alternate films being substantially in registration with each other, said films comprising capacitor electrodes, 4. disposing a green dielectric film over the stack so formed as a cover therefor, 5. subjecting the stack so formed to elevated temperature and pressure to volatilize any organic constituents therein, to compact and coalesce said glass, and to seal adjacent sheets together, thereby forming a substantially monolithic unit, and 6. heat treating said unit so as to partially crystallize the glass to form a glass ceramic and to sinter the noble metal films, this invention provides an improved method wherein step (2) a metal film of noble metal powder, is applied to the green dielectric sheets, the powder consisting essentially of, by weight, 20-90 percent gold powder, 2-30 percent palladium powder and 3-70 percent silver powder, said noble metal powder being further characterized in that the proportions of noble metals lie within the four-sided figure identified in that its area lies within the straight lines connecting points A, B, C and D in FIG. 1. The heat treatment of step (6) is preferably at a temperature in the range of 800°-1,100°C., to sinter the metal film and forms a glass ceramic, more preferably at 800°-1,000°C.

In a method of making a multilayer capacitor comprising the steps of:

1. forming a plurality of thin dielectric sheets in the green state comprising a crystallizable glass powder in an organic binder, 2. applying a first metal film of finely divided noble metal powder dispersed in an inert vehicle to a first of said green dielectric sheets in a predetermined pattern, 3. disposing a second of said green dielectric sheets over said first dielectric sheet bearing said first metal film, substantially in registration with said first dielectric sheet, 4. applying a second metal film of said noble metal powder to said second dielectric sheet in such a manner as to partly overlap said first film, said first and second metal films comprising capacitor electrodes.

5. disposing a third of said green dielectric sheets over the stack so formed substantially in registration with said first and second dielectric sheets, 6. subjecting the assembly to an elevated temperature and pressure to volatilize any organic constituents therein, to compact and coalesce said glass, and to seal adjacent sheets together, thereby forming a substantially monolithic unit, and 7. heat treating said unit so as to partially crystallize the glass to form a glass ceramic, this invention provides the similar improvement of applying as said metal films a noble metal powder consisting essentially of, by weight, 20-90 percent gold powder, 2-30 percent palladium powder and 3-70 percent silver powder, said noble metal powder being further characterized in that the proportions of noble metals lie within the four-sided figure identified in that its area lies within the straight lines connecting points A, B, C and D in FIG. 1. The heat treatment of step (7) is preferably at a temperature in the range 800°-1,100°C., which sinters the metal film and forms a glass ceramic, more preferably is at 800°-1,000°C.

Either said method may further comprise the step of metallizing the ends of said capacitor unit where said non-overlapping ends of said electrodes are exposed.

In the methods of this invention the noble metal powder may preferably consist essentially of about 35-75 percent gold, 5-15 percent palladium, and 15-55 percent silver; more preferably the noble metal powder is about 74 percent gold, 6 percent palladium and 20 percent silver; also more preferably the noble metal powder is about 37 percent gold, 13 percent palladium and 50 percent silver.

Also a part of this invention are multilayer capacitors of at least two electrodes and three dielectric layers, said dielectric layers being a glass ceramic and said electrodes a noble metal powder consisting essentially of, by weight, 20-90 percent gold powder, 2-30 percent palladium powder and 3-70 percent silver powder, said mixture being further characterized in that the proportions of noble metals lie within the four-sided figure identified in that its area lies within the straight lines connecting points A, B, C and D in FIG. 1. Capacitors according to this invention are these wherein said electrodes preferably consist essentially of 35-75 percent gold, 5-15 percent palladium, and 15-55 percent silver; more preferably such electrodes are 74 percent gold, 6 percent palladium and 20 percent silver; also more preferably said electrodes are 37 percent gold, 13 percent palladium and 50 percent silver.

It has been found that certain less expensive ternary noble metal combinations (gold, palladium and silver in the proportions set forth herein) give a sufficiently high melting point to give good electrical properties in multilayer glass-ceramic capacitors, and yet show sufficient match in thermal expansion to glass ceramics and also have the proper degree of ductility to allow the capacitors to cool down after firing without causing severe cracks.

The capacitors may be provided with contacts to the electrodes by removal of edge portions (e.g., abrasively) after sintering, or by providing the green ceramic tape with appropriate notches prior to lamination and sintering. Thereafter contact into electrical circuits may be made in the conventional manner.

BRIEF REFERENCE TO THE DRAWING

The drawing is a ternary phase diagram showing the composition of the noble metal electrode used in the process of the present invention, the composition being within the four-sided figure A, B, C, D (weight percent).

DETAILED DESCRIPTION

McBrayer et al. U.S. Pat. No. 3,604,082, issued Sept. 14, 1971, is hereby incorporated by reference herein. General details of the steps useful in the improved method of the present invention are set forth therein.

The noble metal powders are those conventionally used in the ceramic manufacture art, and are hence finely divided. Conventional vehicles, metal/vehicle proportions, and screen or stencil printing techniques are employed. Optimum metal/vehicle ratios are 40–60 percent metal and 40–60 percent vehicle. Preferred firing temperatures are in the range 800°–1,100°C., and with the electrode compositions of the present method often temperatures in the range 800°–1,000°C. may be used.

The green dielectric sheets may be metallized prior to stacking, and then stacked, or a green dielectric sheet may be metallized, then an unmetallized sheet may be stacked thereon and subsequently the top sheet of the stack may be metallized.

In the following experiments and elsewhere in the specification and claims, all parts, percentages and ratios are by weight.

EXAMPLES AND COMPARATIVE SHOWINGS

Electrode compositions were prepared by dispersing noble metal powders in an inert organic vehicle. The metal powders were very pure and the surface areas were as follows: gold, 0.35 to 0.60 m.$^2$/g.; palladium, 7 to 11 m.$^2$/g.; and silver, 0.75 to 1.35 m.$^2$/g. The organic vehicle consisted of about 10 parts ethyl cellulose binder dissolved in about 90 parts terpineol. The compositions were roll milled to obtain good dispersion of the metal powders, and finally the ratio of binder to thinner was adjusted to give a good printing viscosity. The viscosity was adjusted to 50 to 60Mcps., as measured on a Brookfield HAT viscometer with a number 14 spindle and a small sample holder.

TABLE

| Example or Showing | Composition of Dispersion (wt. %) | | | | Composition of Noble Metal (wt. %) | | | Crack Formation |
|---|---|---|---|---|---|---|---|---|
| | Au | Pd | Ag | Vehicle | Au | Pd | Ag | |
| Example 1 | 44.4 | 3.6 | 12.0 | 40.0 | 74 | 6 | 20 | Slight |
| Example 2 | 22.2 | 7.8 | 30.0 | 40.0 | 37 | 13 | 50 | Slight |
| Example 3 | 18.5 | 6.5 | 25.0 | 50.0 | 37 | 13 | 50 | None |
| Showing A | 60.0 | — | — | 40.0 | 100 | — | — | None |
| Showing B | — | 30.0 | 30.0 | 40.0 | — | 50 | 50 | Severe |
| Showing C | — | 12.0 | 48.0 | 40.0 | — | 20 | 80 | Severe |

The Table shows the weight percent of each metal powder and vehicle in the total composition for each of the examples and comparative showings. The composition of the metal portion of the dispersion also is shown as percentage of total noble metal present.

Each composition was printed on thin green dielectric sheets made from crystallizable glass powder in a binder. The glass powder contained about 13 percent BaO, 9 percent SrO, 18 percent PbO, 48 percent $Nb_2O_5$, 7 percent $SiO_2$, 2 percent $Al_2O_3$, 2.5 percent $B_2O_3$ and 0.5 percent $Cu_2O$. The organic binder was that set forth in Example 1 of U.S. Pat. No. 3,604,082. After each printing, another green dielectric sheet was placed on top of the sheet with wet electrodes and another set of electrodes were printed on top of the top sheet. This process was continued until a stack containing approximately 40 layers resulted. The wet stacks were dried at moderate temperatures (100°–150°C.) and then fired with a gradually increasing temperature to peak temperatures of 800°–1,000°C. in a continuous-belt furnace. The stacks were then cut up into capacitors.

In the Table the crack formation tendency of the resultant fired capacitors is summarized. The compositions of the present invention (Examples 1-3) were found to crack either slightly or not at all, as with the expensive pure gold electrodes in Showing A. Binary mixtures of Pd and Ag were observed to be severely cracked in Showings B and C. It has also been found during this work that some mixtures of gold and silver crack severely, while others do not. The capacitors of each of the examples and showings had commercially acceptable dissipation factors and capacitances; the capacitors of Showings B and C were measured elsewhere than at cracks. In the electrode compositions of Showings B and C, which gave rise to cracks, the cracks apparently arose when the stacks were cooled down from the firing temperature. The cracks generally ran parallel to the direction of the electrodes and are thought to be caused by thermal expansion mismatch combined with the relative hardness of the alloy electrodes in comparison with pure gold electrodes.

Showing A used an expensive all-gold electrode composition material used commercially for making multilayer capacitors with crystallizable glass dielectric tape. Showings B and C used binary palladium/silver compositions, which show a considerable cost reduction in comparison to gold electrodes, but let to cracking. By contrast, the ternary composition of Examples 1–2 of this invention showed good electrical properties with only slight cracks in the resulting multilayer capacitor bodies. Apparently, the ternary compositions of gold, palladium and silver showed the proper combination of melting point to obtain good electrical properties and yet the proper combination of thermal expansion coefficient and ductility to reduce the degree of cracking in the resulting multilayer capacitor bodies. The electrode of Example 3 of the present invention, printed with a low metal content version of the dispersion used in Example 2, had the proper combination of electrical properties with no observable cracking in the resulting capacitor bodies.

A number of variations or alternative procedures may be used in the manufacture of these electrodes which do not change the nature of this invention. For example, prealloyed gold-palladium-silver powders (e.g., produced as in the Hoffman U.S. Pat. Nos. 3,390,381 and 3,385,799; and Short U.S. Pat. No. 3,630,714) might be used instead of mixed elemental powders. Metal powders of other surface areas may be used than those specifically mentioned in the examples. Small quantities of glass powder may be added to the compositions, about 0–10 percent by weight. To improve mechanical or electrical properties of the capacitors, the use of a crystallizable glass similar to that used in the dielectric tape would be desirable.

Various vehicles used in the art may be employed, using numerous binders and solvents, as long as they give a suitable drying rate to allow printing the electrodes by whatever process is chosen. The organic binders must burn out cleanly when the stacked multilayer capacitor is fired. The electrode compositions may be adjusted to whatever viscosity range is suitable for a particular screen printing process. The viscosity range depends on the mesh size of the screen, and the selection of a wet or dry stacking process, etc.

Alternative to the method of preparing multilayer capacitors described in the examples a dry stacking process might be used where sheets are printed separately and dried, possibly overnight. The resulting dry sheets are then stacked and pressed at a suitable temperature and pressure. The dried stacks are then cut up into capacitors, and the green capacitors fired according to the processes described above.

I claim:

1. In a method of making a multilayer capacitor comprising the steps of:
   1. forming a plurality of thin dielectric sheets in the green state comprising a crystallizable glass powder in an organic binder,
   2. applying a metal film of finely divided noble metal powder dispersed in an inert vehicle to at least two of said green dielectric sheets in a predetermined pattern,
   3. disposing said green dielectric sheets, with said metal film applied thereto, in a stack such that each of said metal films is separated from adjacent metal films by one of said green dielectric sheets and such that the first two metal films of the stack partly overlap each other, alternate films being substantially in registration with each other, said films comprising capacitor electrodes,
   4. disposing a green dielectric film over the stack so formed as a cover therefor,
   5. subjecting the stack so formed to elevated temperature and pressure to volatilize any organic constituents therein, to compact and coalesce said glass, and to seal adjacent sheets together, thereby forming a substantially monolithic unit, and
   6. heat treating said unit so as to partially crystallize the glass to form a glass ceramic and to sinter the noble metal films, the improvement of applying in step (2) a metal film of noble metal powder dispersed in an inert vehicle wherein said powder consists essentially of, by weight, 20–90 percent gold powder, 2–30 percent palladium powder and 3–70 percent silver powder, said noble metal powder being further characterized in that the proportions of noble metals lie within the four-sided figure identified in that its area lies within the straight lines connecting points A, B, C and D in the ternary phase diagram of the figure in the drawing.

2. A method for making multilayer capacitors according to claim 1 wherein the heat treatment of step (6) is at a temperature in the range 800°–1,100°C., which sinters the metal film and forms a glass ceramic.

3. A method according to claim 2 wherein the heat treatment step (6) is at 800°–1,000°C.

4. In a method of making a multilayer capacitor comprising the steps of:
   1. forming a plurality of thin dielectric sheets in the green state comprising a crystallizable glass powder in an organic binder,
   2. applying a first metal film of finely divided noble metal powder dispersed in an inert vehicle to a first of said green dielectric sheets in a predetermined pattern.
   3. disposing a second of said green dielectric sheets over said first dielectric sheet bearing said first metal film, substantially in registration with said first dielectric sheet,
   4. applying a second metal film of said noble metal powder to said second dielectric sheet in such a manner as to partly overlap said first film, said first and second metal films comprising capacitor electrodes,
   5. disposing a third of said green dielectric sheets over the stack so formed substantially in registration with said first and second dielectric sheets,
   6. subjecting the assembly to an elevated temperature and pressure to volatilize any organic constituents therein, to compact and coalesce said glass, and to seal adjacent sheets together, thereby forming a substantially monolithic unit, and
   7. heat treating said unit so as to partially crystallize the glass to form a glass ceramic, the improvement of applying as said metal films a noble metal powder dispersed in an inert vehicle wherein said powder consists essentially of, by weight, 20–90 percent gold powder, 2–30 percent palladium powder and 3–70 percent silver powder, said noble metal powder being further characterized in that the proportions of noble metals lie within the four-sided figure identified in that its area lies within the straight lines connecting points A, B, C and D in FIG. 1.

5. The method of claim 1 further comprising the step of metallizing the ends of said capacitor unit where said nonoverlapping ends of said electrodes are exposed.

6. A method according to claim 4 wherein the heat treatment step (7) is at 800°–1,000°C.

7. A method for making multilayer capacitors according to claim 4 wherein the heat treatment of step (7) is at a temperature in the range 800°–1,100°C., which sinters the metal film and forms a glass ceramic.

8. The method of claim 5 further comprising the step of metallizing the ends of said capacitor unit where said nonoverlapping ends of said electrodes are exposed.

9. A method according to claim 1 wherein the noble metal power consists essentially of about 35–75 percent gold, 5–15 percent palladium, and 15–55 percent silver.

10. A method according to claim 9 wherein the noble metal powder is about 74 percent gold, 6 percent palladium and 20 percent silver.

11. A method according to claim 9 wherein the noble metal powder is about 37 percent gold, 13 percent palladium and 50 percent silver.

12. A method according to claim 5 wherein the noble metal powder consist essentially of about 35–75 percent gold, 5–15 percent palladium, and 15–55 percent silver.

13. A method according to claim 12 wherein the noble metal powder is about 74 percent gold, 6 percent palladium and 20 percent silver.

14. A method according to claim 12 wherein the noble metal powder is about 37 percent gold, 13 percent palladium and 50 percent silver.

15. A multilayer capacitor of at least two electrodes and three dielectric layers, said dielectric layers being a glass ceramic and said electrodes a noble metal powder consisting essentially of, by weight, 20–90 percent gold powder, 2–30 percent palladium powder and 3–70 percent silver powder, said mixture being further characterized in that the proportions of noble metals lie within the four-sided figure identified in that its area lies within the straight lines connecting points A, B, C and D in FIG. 1.

16. A capacitor according to claim 15 wherein said electrodes consist essentially of 35–75 percent gold, 5–15 percent palladium, and 15–55 percent silver.

17. A capacitor according to claim 16 wherein said electrodes consist essentially of about 74 percent gold, 6 percent palladium, and 20 percent silver.

18. A capacitor according to claim 16 wherein said electrodes consist essentially of about 37 percent gold, 13 percent palladium and 50 percent silver.

* * * * *